United States Patent
Osaki

(10) Patent No.: US 7,428,642 B2
(45) Date of Patent: *Sep. 23, 2008

(54) METHOD AND APPARATUS FOR DATA STORAGE

(75) Inventor: Nobuyuki Osaki, Campbell, CA (US)

(73) Assignee: Hitachi, Ltd., Tokyo (JP)

( * ) Notice: Subject to any disclaimer, the term of this patent is extended or adjusted under 35 U.S.C. 154(b) by 676 days.

This patent is subject to a terminal disclaimer.

(21) Appl. No.: 10/965,064

(22) Filed: Oct. 15, 2004

(65) Prior Publication Data

US 2006/0085636 A1    Apr. 20, 2006

(51) Int. Cl.
    *G06F 13/00*    (2006.01)
    *G06F 12/14*    (2006.01)
(52) U.S. Cl. .................. 713/189; 711/111; 711/164
(58) Field of Classification Search .................. 713/189
See application file for complete search history.

(56) References Cited

U.S. PATENT DOCUMENTS

| | | | |
|---|---|---|---|
| 5,235,641 A | | 8/1993 | Nozawa et al. |
| 5,584,023 A | * | 12/1996 | Hsu ........................... 707/204 |
| 5,857,021 A | * | 1/1999 | Kataoka et al. ............... 705/54 |
| 5,940,507 A | | 8/1999 | Cane et al. |
| 6,260,120 B1 | * | 7/2001 | Blumenau et al. ........... 711/152 |
| 6,292,876 B1 | * | 9/2001 | Golding ....................... 711/163 |
| 6,453,369 B1 | * | 9/2002 | Imamura et al. .............. 710/36 |
| 6,678,828 B1 | | 1/2004 | Pham et al. |
| 6,684,209 B1 | | 1/2004 | Ito et al. |
| 6,931,530 B2 | | 8/2005 | Pham et al. |
| 7,082,503 B2 | * | 7/2006 | Ito et al. ....................... 711/152 |
| 7,165,157 B2 | * | 1/2007 | Eguchi et al. ................ 711/163 |
| 7,213,118 B2 | * | 5/2007 | Goodman et al. ........... 711/163 |
| 7,213,155 B2 | * | 5/2007 | Sako et al. ................... 713/189 |
| 2003/0115447 A1 | | 6/2003 | Pham et al. |
| 2003/0126360 A1 | * | 7/2003 | Camble et al. ............... 711/114 |
| 2005/0120359 A1 | | 6/2005 | Shoji et al. |
| 2006/0080516 A1 | * | 4/2006 | Paveza et al. ................ 711/162 |

FOREIGN PATENT DOCUMENTS

| | | |
|---|---|---|
| WO | 00/55750 | 9/2000 |
| WO | 02/093314 | 11/2002 |

OTHER PUBLICATIONS

"Data Encryption Standard (DES)", FIPS Pub 42, Nat. Bur. of Standards, Dec. 30, 1993, pp. 1-16.
"Advanced Encryption Standard (AES)", FIPS Pub 197, Nat. Bur. of Standards, Nov. 26, 2001, pp. i-47.

* cited by examiner

*Primary Examiner*—Matthew Heneghan
(74) *Attorney, Agent, or Firm*—Mattingly, Stanger, Malur & Brundidge, P.C.

(57) ABSTRACT

An apparatus, system, and method for avoiding unexpected exposure of important data in a storage system include a table that contains permission and conversion information regarding data transfer. When a storage system transfers a certain set of data from one logical device or volume to another area, e.g., a host, a tape storage or another logical device or volume inside or outside of the storage system, the storage system refers to the table to determine if transfer is permitted and whether conversion of the data is required before transfer. A storage controller converts the data if necessary, and transfers the data to the target destination if permitted. Keys are maintained within the storage system so that the management of securing data is centralized.

33 Claims, 7 Drawing Sheets

FIG. 2

| Source | State | Volume 104 | Volume 105 | Target Volume 106 | HBA 111 | HBA 113 |
|---|---|---|---|---|---|---|
| Volume 104 | (P) | | (E, K1), (B) | NA | (P), (B) | (E, K2), (U) |
| Volume 105 | (E, K1) | (P), (B) | | NA | (P), (U) | (E, K2), (U) |
| Volume 106 | (P) | NA | NA | | (E, K4, C, C1), (U) | NA |

FIG. 3

| Algorithm ID | Attributes |
|---|---|
| K1 | DES, ECB Mode, 0x1234567812345678 |
| K2 | DES, ECB Mode, 0x8765432187654321 |
| K3 | 3DES, ECB Mode, 0x1234567812345678, 0x8765432187654321 |
| K4 | DES, ECB Mode, 0xabcdefabcdefabcd |
| C1 | ZIP, Whole Data, ISO/IEC 9797-1 method 2 |
| C2 | LHA, 1 M bytes, ISO/IEC 9797-1 method 3 |

115

| Algorithm ID | User ID | Password |
|---|---|---|
| K1 | HBA 111 | abcdef |
| K2 | HBA 111 | 012345 |
| K3 | Administrator | 9876543210 |
| K4 | | |

108a

| Source | State | Volume 104 | Volume 105 | Volume 106 | HBA 111 | HBA 113 | Volume 704 via 702,T03 |
|---|---|---|---|---|---|---|---|
| | | | | Target | | | |
| Volume 104 | (P) | | (E, K1), (B) | NA | (P), (B) | (E, K2), (U) | NA |
| Volume 105 | (E, K1) | (P), (B) | | NA | (P), (U) | (E, K2), (U) | NA |
| Volume 106 | (P) | NA | NA | | (E, K4, C, C1), (U) | NA | (E, K2), (B) |

| Source | State | Volume 104 | Volume 105 | Volume 106 | HBA 111 | HBA 113 |
|---|---|---|---|---|---|---|
| | | | | Target | | |
| Volume 104 | (P) | | (E, K1), (B) | NA | (P), (B) | (E, K2), (U) |
| Volume 105 | (E, K1) | (P), (B) | | NA | (P), (U) | (E, K2), (U) |
| Volume 106 | (P) | NA | NA | | (E, K4, C, C1), (U) | NA |

FIG. 9

METHOD AND APPARATUS FOR DATA STORAGE

BACKGROUND OF THE INVENTION

1. Field of the Invention

The present invention relates to data storage, and, more particularly, to access control technology for secure data storage whereby the data is protected from unauthorized access.

2. Description of the Related Art

It is known that data is a valuable corporate asset that needs to be protected from unauthorized access. Access control technologies prevent unauthorized users from accessing data without permission. Known technologies include zoning or LU masking, such as that disclosed in WO 0055750 A1 and U.S. Pat. No. 6,684,209 B1, respectively, which limit access to a certain data volume or storage system to specific hosts. Operating systems for computer systems are also equipped with user privilege management functions.

However, the prior art systems leave behind security gaps which cannot be protected by such access controls. For example, even when a storage system is protected by access control mechanisms, data copied to tapes or remote storage systems may be subject to breach, or tapes or magnetic disks may be physically stolen.

One of the reasons why such incidents happen is that access control is achieved by many components, such as clients, servers, switches and storage systems. Even when a storage system allows access to only authenticated servers, security can be ineffective if even one of the servers does not securely manage user privileges. For example, devices such as switches, which sit between hosts and storage systems, can convert data coming out of the storage systems. However, if an attempt is made to monitor every switch, there will be a large number of devices to manage as well as a large amount of data, which would make a storage area network (SAN) fabric management very complex. This also increases the burden placed upon administrators that need to configure security for numerous devices. In addition, such an approach requires encryption of all of the stored data in storage systems in order to avoid unexpected exposure of the data using the default setting, which increases the risk that the original data will be lost if the key and algorithm information is lost.

Another reason for security breaches is that it often happens that those who can access volumes which contain confidential data do not necessarily have to see the contents of the data. For example, a storage administrator who configures a remote copy of data from a storage system to a tape may not have to understand the meaning of the data created by business applications. To avoid such unnecessary security gaps, all of the data exiting a storage system needs to be secured unless otherwise authorized.

WO 2002093314 A2 discloses an encryption-based security system for network storage in which a device sits between a host and a storage system intercepting the communications between them. The device encrypts data downward to the storage system, and decrypts it upward to the host, so that all of the data inside the storage system is encrypted.

U.S. Pat. No. 5,235,641 discloses a file encryption method and a file cryptographic system which encrypts and decrypts data in storage systems, while leaving the key-generation function at the host side.

U.S. Pat. No. 5,940,507 discloses an information processing system providing archive/backup support with privacy assurances by encrypting data stored by the system.

Information on DES (data encryption standard) can be found at DATA ENCRYPTION STANDARD (DES), Federal Information Processing Standards Publications (FIPS Pub 46-2), National Bureau of Standards, 1988, http://www.itl.nist.gov/fipspubs/fip46-2.htm.

Information on AES (advanced encryption standard) can be found at ADVANCED ENCRYPTION STANDARD (AES), Federal Information Processing Standards Publications (FIPS Pub 197), National Bureau of Standards, 2001, http://csrc.nist.gov/CryptoToolkit/aes/.

The entire disclosures of WO 0055750 A1; WO 2002093314 A2; U.S. Pat. No. 5,235,641; U.S. Pat. No. 5,940,507; and U.S. Pat. No. 6,684,209 B1 are hereby incorporated by reference.

BRIEF SUMMARY OF THE INVENTION

The present invention is directed to a method, apparatus and system for data storage. When a storage system transfers a certain set of data from one volume to another area, e.g., a host, a tape storage, or another volume inside or outside of the storage system, the storage system looks for a table which describes permission and/or conversion of the transfer. A storage controller converts the data and transfers the data to the target destination, if granted permission according to the table. If, for example, the system sets "allow after encryption" as the default, unexpected breach of confidential data can be avoided and data can be protected even after the data is moved outside the control of the storage system.

These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated, wherein:

FIG. 2 illustrates an example of a conversion table of the invention.

FIG. 3 illustrates an example of an algorithm ID table of the invention.

FIG. 8 illustrates a conversion definition table of the invention for use with the embodiment of FIG. 7.

FIG. 9 illustrates a conversion definition table used for the re-key of data on a volume.

DETAILED DESCRIPTION OF THE INVENTION

Figure 1:
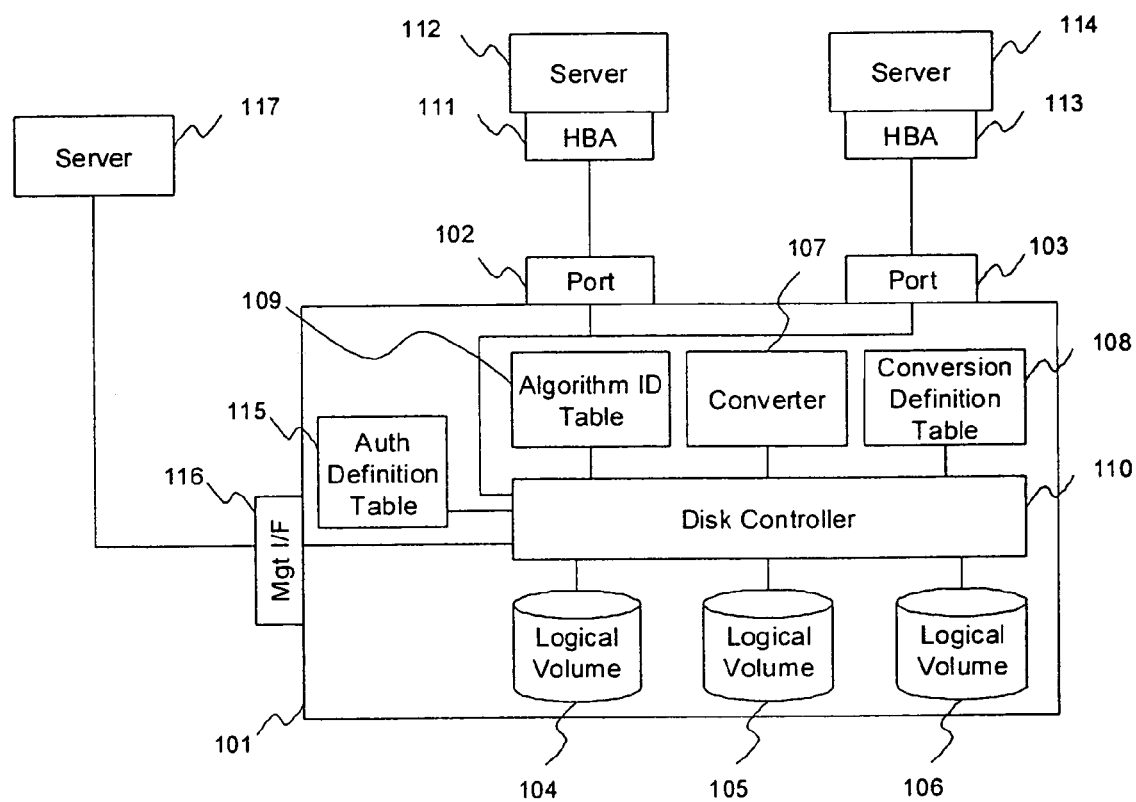
FIG. 1 illustrates the basic system configuration of the invention.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views.

System Configuration

FIG. 1 Illustrates the basic system configuration of the invention. 101 is a storage system which has logical devices or logical volumes 104, 105, and 106, which serve as data storage locations, and which may be realized as physical storage devices such as a partitioned single hard disk drive, a plurality of hard disk drives, a RAID array, or other known storage device(s). A disk controller 110 is included for controlling read and write requests of the data on the volumes from servers. System 101 also includes a converter 107 which may perform encrypt/decrypt, compress/uncompress functions, and which may be implemented as a software module or a hardware accelerator. System 101 further includes a conversion definition table 108, which contains notations regarding data transfer permissions and conversion requirements, as will be described in more detail below. System 101 may also include an algorithm ID table 109 which at least contains keys and algorithm IDs for encryption and decryption. In addition, an authentication definition table 115 may be provided for use in verifying the authenticity of an entity requiring key retrieval, as will be described in more detail below. Furthermore, ports 102, 103 are included in system 101 for host connections, whereby devices, users, hosts, and the like, such as servers 112 and 114 are connected with storage system 101 via host bus adapters (HBA's) 111 and 113, respectively, or the like.

System Operation

FIG. 2 illustrates an example of a conversion definition table 108 of FIG. 1. In table 108, data locations or sources, designated logical devices or volumes 104, 105, 106 in the storage system 101 are listed in the column 201, which are called source devices or volumes here, and the column 202 explains the state of the source devices or volumes 104, 105, 106. The state may be plain/clear (P), encrypted (E), or compressed (C). When the data is not in the plain state P, an algorithm ID may follow for relating information to encryption or compression. The compressed state C may be combined with both the plain state P and the encrypted state E.

FIG. 3 illustrates an example of algorithm ID table 109. As shown in the first column 301 of table 109, each algorithm ID for encryption (algorithm ID's 302, 305, 306, 307) is at least associated with an algorithm set, such as DES, 3DES, AES, etc., a mode such as ECB mode, CBC mode, etc and a key, as designated in the "Attributes" column 308 of table 109. The algorithm ID for encryption may also have date information specifying when the key is generated since keys and/or encryption algorithms may need to be updated as cryptographic technology advances.

Referring back to FIG. 2, conversion table 108 includes targets 203-207 to which each volume 104-106 in the column 201 could be exposed, i.e., data on the source volume 104-106 may be read, copied, or written by the target 203-207. In addition, each cell of the table 108 contains the state of how the data is exposed to the target and the possible directions of data transfer. The notation of the state in each cell is the same as in column 202.

Regarding the possible directions of data transfer, "U" stands for unidirectional, i.e., from the source to the target only, and "B" stands for bi-directional, i.e., from the source to the target and from the target to the source. When "NA" is specified, it means the source volume is not allowed to be accessed by the target at all. Of course, the notation explained above and in FIGS. 2 and 3 may be different with respect to the format of specific implementations of the invention.

Considering cells 210 and 211, for example, the usage of conversion table 108 is explained as follows. The data on volume 104 is plain in state, as indicated by the "P" in state column 202. If a request is received to transfer data from volume 104 to volume 105, an examination of cell 210 indicates that data is allowed to be copied to volume 105 after encryption (as indicated by the "E") using the algorithm having algorithm ID K1, as identified by item no. 302 in algorithm ID table 109 in FIG. 3. Also, because the direction shown in cell 210 is bi-directional, as indicated by the "B" in cell 210, the data on volume 105 is allowed to be copied to volume 104 after decryption using the algorithm ID K1. Thus, cells 210 and 213 specify basically the same data transfer, and must be consistent.

In another example, the data on volume 105 is encrypted with the algorithm ID K1, as indicated in the state column 202. As indicated in column 206, cell 211 of table 108, data on volume 105 is allowed to be read by server 112 via HBA 111. The reason why the ID of the HBA (e.g., HBA's 111, 113) is used in table 108 instead of the ID or name of the server (e.g., servers 112, 114), is that the authentication between a storage system and a server is conventionally performed using WWN (world wide name) of an HBA. However, this should not be interpreted to limit this invention. It could be a WWN of an HBA, any ID of a server, an ID of an application running on the server, or an ID of a user if such technologies to identify applications or users are available.

Because the state of data exposed to HBA 111 is "P", the data which the server 112 can look at must be transferred in clear format. Accordingly, since the data on volume 105 is encrypted, the data must be converted by decryption with the algorithm ID K1 for transfer to HBA 111 and server 112. In addition, since unidirectional is specified by the "U" in cell 211, the server 112 is not allowed to write data on the volume 105.

In another example, cell 212 indicates what type of communication, if any, can occur between volume 106 and HBA 111. The data in volume 106 is in the plain (P) state and prior to transfer to HBA 111, the data has to be encrypted with algorithm ID K4, as indicated by the "E" and "K4" in cell 212. Additionally, the data is required to be compressed with algorithm ID C1, as indicated by the "C" and "C1" in cell 212. In this regard, it is preferable to compress the data prior to encryption since compression after encryption is more difficult. Furthermore, since unidirectional is specified by the "U" in cell 212, data can only be transferred from volume 106 to HBA 111 (server 112), but server 112 cannot transfer data to volume 106 via HBA 111.

Figure 4:
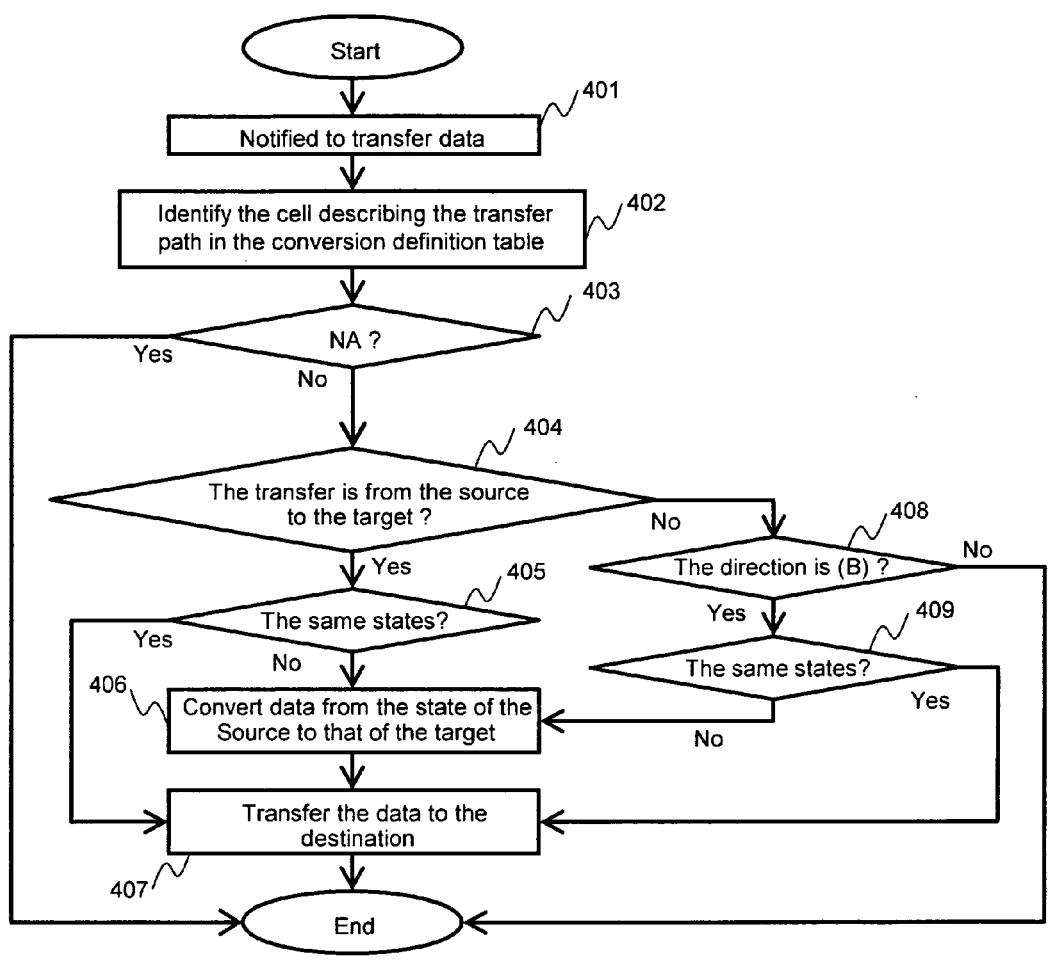
FIG. 4 is a flow chart describing one example of how the disk controller transfers data on the volumes in response to I/O requests or data copy requests based on the conversion table.

FIG. 4 is a flow chart illustrating an example of how disk controller 110 of FIG. 1 operates when transferring data on the volumes 104-106 in response to I/O requests or data copy requests based on conversion table 108. When disk controller 110 is notified to transfer data (step 401), disk controller 110 checks conversion definition table 108 to identify the cell of conversion definition table 108 which describes the transfer path (step 402). If examination of the table shows that the conversion type is NA (step 403), disk controller 110 ends the process (End). If not, then disk controller 110 checks the direction of the transfer (step 404). If the direction is from the source to the target, the disk controller 110 checks if the state of the source and that of the target are the same (step 405), e.g., both plain or both encrypted with the same algorithm ID. If the states are the same, the disk controller 110 transfers the data from the source to the target (step 407). If they are not the same, the disk controller 110 converts the data from the state of the source to the state of the target (step 406), and then transfers the converted data to the target.

Considering cell 210 of FIG. 2, for example, since the state of the source volume 104 is plain and the state of the target volume 105 is encrypted with the algorithm ID K1, the data on the volume 104 is encrypted with the algorithm ID K1 prior to transfer. Once the data is converted, the data is transferred to the target (step 407 in FIG. 4). If the direction of the transfer is from the target to the source, and the direction is not bi-directional (step 408), the disk controller 110 terminates the transfer (End). If the direction of the transfer is from the target to the source, and the direction is bi-directional (step 408), and the state of the target and that of the source are the same (step 409), the data is transferred to the source (step 407). If the states are not the same, the data is converted (step 406) and then transferred (step 407).

FIG. 4 is simplified for the purpose of explanation, and the process of the invention is customized according to the implementation of the data transfer mechanisms of storage systems. For example, when a large amount of data is transferred from the source to the target, encryption, decryption, and data transfer are processed on a block by block basis, i.e., the checking processes, such as steps 403, 405, 408 and 409, need to be performed only once while data conversion (step 406) and data block transfer (step 407) need to be repeated until total data transfer completes. The following are some remarks on the conversion of data at step 406 from the state of the source to the state of the target.

In general, compression is done before encryption because the compression rate of encrypted data becomes lower. Due to this reason, the order of the process in which it is specified that data is compressed before encryption and uncompressed after decryption is omitted here. However, the order of these processes usually needs to be explicitly specified in the algorithm ID table 109 if the conversion of data states consists of several functions, e.g., both encryption and compression, unless the order is defined implicitly.

The algorithm ID contains the information on how data is compressed or uncompressed. Items 303 and 304 in FIG. 3 are examples of compression algorithm IDs. For example, algorithm ID 303 means the whole data is compressed or uncompressed using a ZIP algorithm.

When the data is compressed, the converter 107 of system 101 loads all data to be compressed from an input which may be a source, a target, or other function, and then compresses the data using the specified compression algorithm, such as a ZIP algorithm, or the like. The resultant data may be padded using a specified padding mechanism. In the algorithm ID 303, because the length of the resultant data may not be divisible with a block size commonly used in SCSI protocol, such as a block size of 512 bytes, a padding mechanism is used. For example, under ISO/IEC 9797-1 Method 2 for padding data, the message is appended with a single 1 and then as many 0's as necessary to make the message length divisible by n. The final 1 acts as a marker of the end of the message. The padded data is transferred to the destination, which may be a source, a target, or the other function, such as encryption.

When the data is to be uncompressed, the converter 107 loads all data to be uncompressed from an input which may be a source, a target, or other function, such as decryption. Then the converter 107 removes padding data according to the padding mechanism. The resultant data is then uncompressed using the specified algorithm, such as the ZIP algorithm, and transferred to the destination, which may be a source, a target, or the other function.

When the size of the total data on the volume 106 is queried by server 112, the size of compressed data is calculated by the converter 107 and is returned to the server 112. This size may be recorded as an additional field (not shown) in the conversion definition table 108. When the data on the volume 106 is updated, the size may be recalculated. Furthermore, when it is known that only a certain area of the volume data is frequently updated, it is beneficial to divide the whole data into several parts, and calculate the size of each part. When the data on the volume is queried, the sum of each part's size is calculated and then returned to the server, which reduces the calculation time.

Algorithm ID 304 in FIG. 3 is an example for compressing divided data. The whole data of the source volume is divided into 1M bytes or less data and each part is compressed using an LHA algorithm, as indicated in the Attributes column 308. The resultant data is padded using an ISO/IEC 9797-1 method 3, which explicitly adds the length of data before compression to the front of the compressed data. Under the ISO/IEC 9797-1 Method 3 for padding data, the message is appended with zeros until the message length is divisible by n, and then an extra block is added to the front of the data stream which consists of the length of the original message (padded with zeroes on the left to make it a whole block). When this algorithm is used, the size of only an updated portion of the data needs to be calculated.

As illustrated in FIG. 2, when the data on volume 105 is transferred to the server 114 via HBA 113 based on cell 214 of the conversion definition table 108, the data on volume 105 is firstly decrypted with the algorithm ID K1 (as indicated by the state of volume 105 in column 202) and then encrypted with the algorithm ID K2 (as indicated by the state of HBA 113 relative to volume 105 in cell 214) before the data is transferred to the server 114.

Keys to encrypt and decrypt data are generated inside the storage system 101. They do not leave storage system 101 unless the access is properly authenticated. Keys are stored on the algorithm ID table 109, which contains one or more of algorithm IDs. Key retrieval protocol may be implemented over an IP network, such as an Https, a Fiber channel network or any other network protocol. As illustrated in FIG. 1, interface 116 is the interface which is used for the management server 117 to interface with the storage system 101 in order to retrieve keys.

Figures 6, 7:
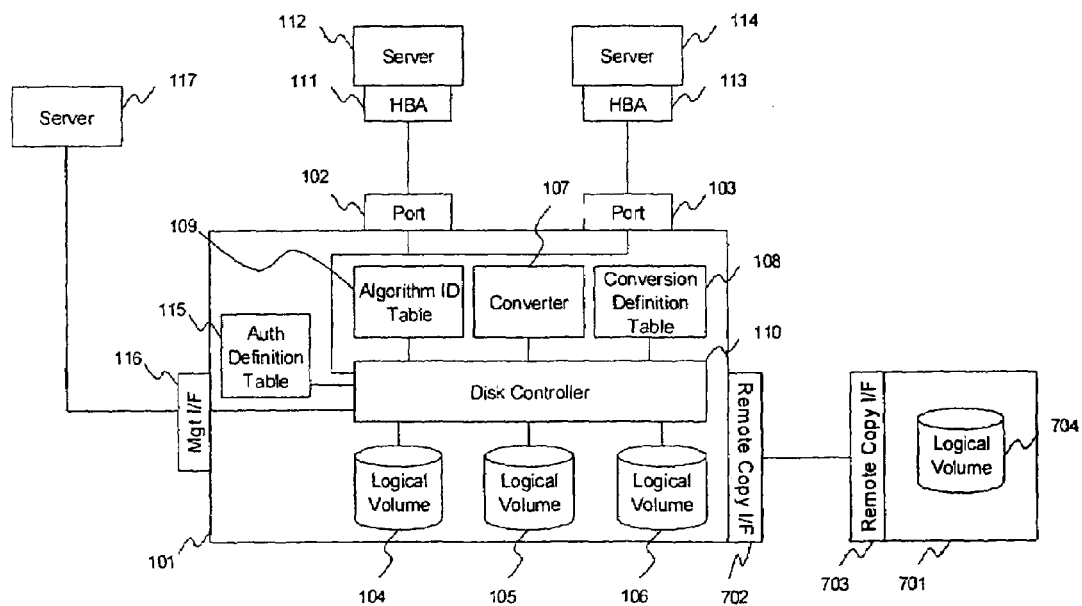
FIG. 6 illustrates an authentication definition table of the invention.
FIG. 7 illustrates the system of the invention for remote copy of data from a local volume to a remote volume.

As illustrated in FIG. 6, an authentication definition table 115 is used to verify the authenticity of the entity requiring key retrieval. Algorithm ID table 109, conversion definition table 108, and authentication definition table 115 can be securely backed up to an area outside the storage system 101, such as to IC cards, PCs, etc. with appropriate protection such as encryption or password protection.

The privileges for configuring the conversion definition table 108 and authentication definition table 115 need to be defined in addition to those tables. Existing technologies can be used to control the accesses to those tables (such as ACL by UNIX, for example). The configuration may be done when a volume is created in the storage system 101, or sometime thereafter. Configuration may also be performed when a new path to expose data is added, e.g., when a new port connected to a host is added or a new remote copy pair is created, or at some point thereafter.

In order for the objectives of the invention to be understood better, an example scenario in which the present invention may be implemented will now be described. An application is running on the server 112 and reading and writing data on volume 104. Data on volume 104 is replicated to volume 105. A storage administrator logs on to the server 114 and does some storage management, such as volume creation or configuration of the replication from volume 104 to 105.

Data on volume 104 is allowed to be seen from the server 112, because the application on the server 112 needs to read, process, and write the data. The storage administrator logging on to the server 114 needs to access the volume 104 and 105 in order to configure the replication from volume 104 to volume 105, but does not need to understand the contents of the data on volume 104 and 105.

Using the invention, the storage administrator can access volume 104 and can read encrypted data, though the data on volume 104 is not actually encrypted. The data on volume 104 is encrypted when it leaves the volume 104. Writing on the volume 104 by the storage administrator is not allowed so as to keep the data consistency because the storage administrator does not have the keys to decrypt and encrypt the data.

Figure 5:
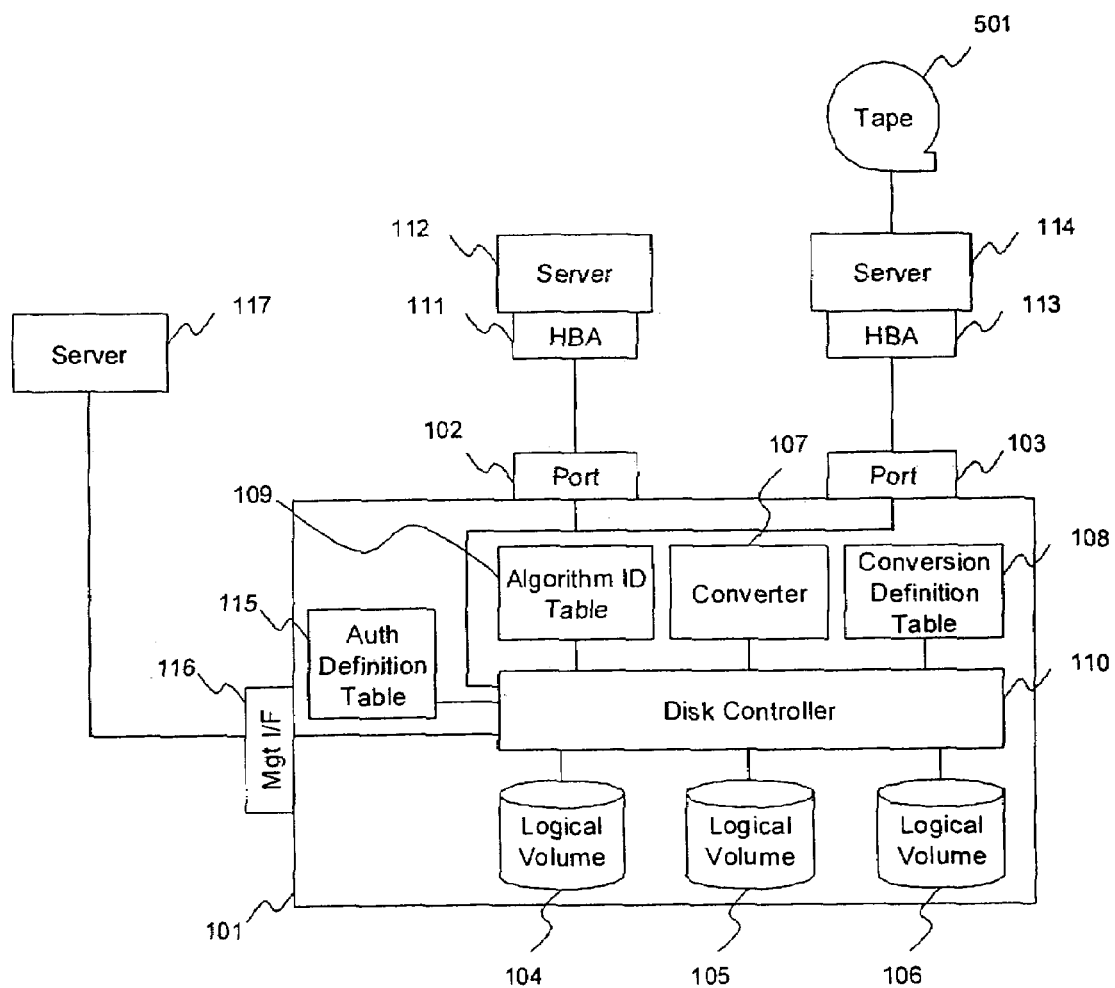
FIG. 5 illustrates the system of the invention for copying data from a volume to a tape.

Under another exemplary scenario, data is copied from a volume, such as volume 104, to a tape 501 as illustrated in FIG. 5. Server 114 may be able to encrypt data on volume 104 before writing the data onto tape 501, but the chances are that the server 114 is managed by a person other than the storage administrator who is responsible for the security of all the data inside the storage system 101, and may forget to configure the encryption before writing on the tape. Of course, it may be insecure if the data is transferred to the server 114 without any encryption. Using the invention, however, data leaving the storage system 101 can be configured to be encrypted in accordance with the conversion requirements of cell 215 and, thus, management of the confidentiality of the data is centralized.

Under yet another exemplary scenario, as illustrated in FIG. 7, data from volume 106 is copied to a remote volume 704 in a remote storage system 701 via remote copy interfaces 702 and 703. The storage system 701 may be managed by a third party organization and the data transferred to the volume 704 may need to be protected. In such case, the data on volume 106 can be encrypted before being copied to the volume 704 based on a conversion definition table, such as table 108a in FIG. 8 (see column 901). The data copied to the remote volume 704 may be restored to the volume 106 in case the data on volume 106 collapses. In such a case, the data on remote volume 704 is copied to storage system 101, decrypted with algorithm ID K2, and then written to volume 106.

To avoid unexpected security breaches, it is beneficial for users of the storage system to automatically generate the conversion table 108 so that no one can see any clear (P) data without explicit configuration by administrators. For example, without explicit definition, each cell can be set to NA or the state of "(E, Kx), (U)" so that the data on the volume can not be stolen, or if it is somehow stolen, it is encrypted.

When the data on volume 104 is exposed to a certain user logging on the server 114 in encrypted form, there is no security if the user is allowed to retrieve the algorithm ID information which is used for the encryption. The disk controller 110 can have a function to detect such a problem by comparing the conversion definition table 108 and authentication definition table 115.

The key and encryption algorithm needs to be updated when encrypted data is stored for a long time. In such a case, a re-keying process is run. FIG. 9 illustrates the conversion definition table 108b which is used for the re-keying of the data on a volume, such as volume 105.

First, the state of data exposed to the target and direction of the data transfer is inserted into the cell 1001, which otherwise is normally blank. This action is preferably instructed from outside the storage system 101, such as by the management server 117. Actually the direction of the data transfer does not mean anything here. In this example, the algorithm ID for data on volume 105 is changed from K1 to K3. Then, the disk controller 110 reads data block by block and converts the data using the algorithm IDs K1 and K3. Most of the conventional encryption algorithms do not change the length of the data after encryption, the converted block is written on exactly the same position where it was read. This block by block process is repeated until the conversion of all of the data in volume 105 completes. When the conversion completes, the state of the volume in column 202 is overwritten with the state of the cell 1001 and then the cell 1001 is set blank. The disk controller 110 can accept I/O, when it is allowed, coming into the volume during the conversion since it can identify an appropriate algorithm ID by keeping the information if the data has already been converted or not. Of course, it is also possible to convert plain data into encrypted or encrypted into plain.

Volume level conversion is explained above, however, obviously, this technology can be extended to file level conversion. In such a case, the entries in the conversion definition table 108 and authentication definition table 115 become files not volumes.

The invention can process any conversion. For example, encryption/decryption is assumed in the above explanation, but only compression without encryption/decryption can be processed. If a one-way function is specified, such as SHA-1 or md5, the direction specified on the conversion definition table 108 may be unidirectional.

Figure 10:
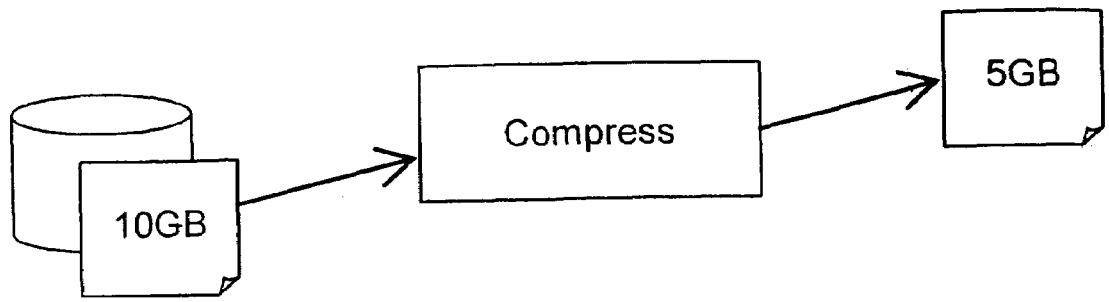
FIG. 10 illustrates the compression of data upon transfer.
Figure 11:
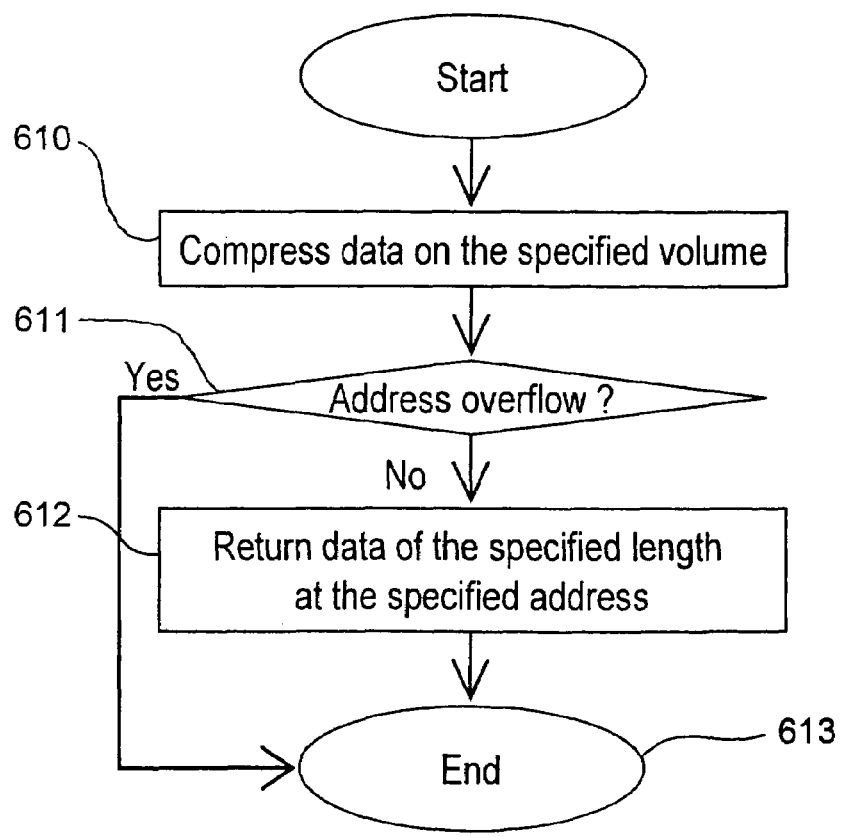
FIG. 11 illustrates a flowchart of an embodiment of the present invention in which compressed data is checked for an address overflow.

FIGS. 10 and 11 show another embodiment in which data is first compressed from 10 GB to 5 GB before transfer. However, transfer cannot occur until the correct size of data is requested. As shown in Step 610, of FIG. 11, data is compressed as required by the conversion definition table. At Step 611, it is determined if there is a data overflow. In other words, it is determined if the requested size of data matches the actual size of the data. If so, then the data of the specified length is returned (Step 612). If not, then the process ends (Step 613). An example of when data would not be transferred is when there is an attempt to read 10 GB data from 5 GB data. Another example is an attempt to read 512 bytes from the end of the volume.

While specific embodiments have been illustrated and described in this specification, those of ordinary skill in the art appreciate that any arrangement that is calculated to achieve the same purpose may be substituted for the specific embodiments disclosed. Thus, this disclosure is intended to cover any and all adaptations or variations of the present invention, and it is to be understood that the above description has been made in an illustrative fashion, and not a restrictive one. Other embodiments may be utilized and derived therefrom, such that structural and logical substitutions and changes may be made without departing from the scope of the invention. The scope of the invention should properly be determined with reference to the appended claims, along with the full range of equivalents to which such claims are entitled.

What is claimed is:

1. A storage system comprising:
   a plurality of logical devices; and
   a disk controller having access to said plurality of logical devices, said disk controller controlling a transfer of data stored in one device selected from the plurality of logical devices to another device selected from the plurality of logical devices or an additional device to which the disk controller is coupled; and a conversion definition table to be examined by said disk controller prior to the transfer of the data, the conversion definition table containing rules regarding the transfer of the data between said one device and said another device, including whether the transfer is possible, and if so, whether the transfer is unidirectional from said one device and said another device or bi-directional between said one device and said another device, wherein when said another device has access permission for the data stored on said one device, the conversion definition table defines whether data from said one device needs to be decrypted or decompressed during transmission and whether said data needs to be subsequently encrypted or compressed during transmission to said another device, including information regarding corresponding encryption keys, and whereby, by referring to the conversion definition table, rules regarding data transfer between the plurality of logical devices can be accomplished such that security of data can be maintained as needed.

2. The storage system according to claim 1, wherein in a case where said another device requires encrypted data, data from said one device is encrypted during transmission.

3. The storage system according to claim 2, wherein an appropriate attribute for encryption is selected from an algorithm ID table.

4. The storage system according to claim 1, wherein in a case where said another device requires compressed data, data from said one device is compressed during transmission.

5. The storage system according to claim 4, wherein an appropriate attribute for compression is selected from an algorithm ID table.

6. The storage system according to claim 1, wherein in a case where said another device requires encryption and compression, the data is first encrypted and then compressed.

7. The storage system according to claim 6, wherein appropriate attributes for encryption and compression are selected from an algorithm ID table.

8. The storage system according to claim 1, wherein in a case where said one device has encrypted data, said encrypted data is decrypted during transmission.

9. The storage system according to claim 1, wherein in a case where said one device has compressed data, said compressed data is decompressed during transmission.

10. The storage system according to claim 1, wherein in a case where said one device has encrypted and compressed data, said data is decompressed and then decrypted during transmission.

11. The storage system according to claim 1, wherein in a case where said one device and said another device have a same state, the data is directly transferred, said state being at least one of an encrypted/unencrypted state or a compressed/uncompressed state of the data.

12. The storage system according to claim 1, wherein said another device is a tape drive.

13. The storage system according to claim 1, wherein said another device is a remote storage system.

14. The storage system according to claim 1, wherein the conversion definition table can be accessed remotely for management purposes.

15. The storage system according to claim 1, wherein a default setting for at least one of the logical devices in the conversion definition table is set to always encrypt before transferring to any another device.

16. The storage system according to claim 1, wherein when the state of the data stored in said one device is encrypted with a first algorithm ID, said data is subjected to a re-keying process whereby the encryption of said data is converted from said first algorithm ID to a second algorithm ID that is different from said first algorithm ID.

17. The storage system according to claim 16, wherein said disk controller performs said re-keying process by reading said data on a block by block basis and converting said data using said first and second algorithm IDs until the encryption of all of said data stored in said first device is converted from said first algorithm ID to said second algorithm ID.

18. The storage system according to claim 1, wherein said another device is an external device external of said storage system and able to couple to said storage system.

19. A system for storing and transferring data comprising:
a server; and
a storage system, the storage system comprising:
a plurality of logical devices;
a disk controller coupled to said server and said plurality of logical devices; and
a conversion definition table to be examined by said disk controller prior to a transfer of data, the conversion definition table containing rules regarding if and how the data can be transferred between the server and any of the plurality of logical devices, between one logical device and another logical device, or between one logical device or the server and an external device, including whether the transfer is unidirectional or bi-directional,
wherein the conversion definition table contains information including a conversion state of data stored in one device selected from the plurality of the logical devices or said server, and whether another device selected from the plurality of logical devices, said server or the external device has access permission for such data,
wherein when said another device has access permission for the data stored on said one device, the conversion definition table defines whether data from said one device needs to be decrypted or decompressed during transmission and whether said data needs to be subsequently encrypted or compressed during transmission to said another device, including information regarding corresponding encryption keys, and
whereby, by referring to the conversion definition table, rules regarding data transfer between the plurality of logical devices can be accomplished such that security of data can be maintained as needed.

20. The system according to claim 19, wherein in a case where said another device, server or external device requires encryption and compression, the data is first encrypted and then compressed.

21. The system according to claim 19, wherein an appropriate attribute for encryption is selected from an algorithm ID table.

22. The system according to claim 19, wherein an appropriate attribute for compression is selected from an algorithm ID table.

23. The system according to claim 19, wherein appropriate attributes for encryption and compression are selected from an algorithm ID table.

24. The system according to claim 19, wherein in a case where said one device has encrypted data, said encrypted data is decrypted during transmission.

25. The system according to claim 19, wherein in a case where said one device has compressed data, said compressed data is decompressed during transmission.

26. The system according to claim 19, wherein in a case where said one device has encrypted and compressed data, said data is decompressed and then decrypted during transmission.

27. The storage system according to claim 19, wherein when the state of the data stored in said one device is encrypted with a first algorithm ID, said data is subjected to a re-keying process whereby the encryption of said data is converted from said first algorithm ID to a second algorithm ID that is different from said first algorithm ID.

28. The storage system according to claim 27, wherein said disk controller performs said re-keying process by reading said data on a block by block basis and converting said data using said first and second algorithm IDs until the encryption of all of said data stored in said first device is converted from said first algorithm ID to said second algorithm ID.

29. The system according to claim 19, wherein in a case where said one device and said another device have a same state, the data is directly transferred, said state being at least one of an encrypted/unencrypted state or a compressed/uncompressed state of the data.

30. The system according to claim 19, wherein said external device is a tape drive.

31. The system according to claim 19, wherein said external device is a remote storage system.

32. The system according to claim 19, wherein the conversion definition table can be accessed remotely for management purposes.

33. The system according to claim 19, wherein a default setting for at least one of the logical devices in the conversion definition table is set to always encrypt before transferring to any other logical device, server or other device.

* * * * *